US006103346A

United States Patent [19]

Nakajo et al.

[11] Patent Number: 6,103,346

[45] Date of Patent: Aug. 15, 2000

[54] SHEET-LIKE KEY TOP AND ITS MANUFACTURING METHOD

[75] Inventors: Masaru Nakajo; Kenji Ohgitani; Satoshi Kudo, all of Tokyo, Japan

[73] Assignee: Polymatech Co., Ltd., Tokyo, Japan

[21] Appl. No.: 09/056,295

[22] Filed: Apr. 7, 1998

[30] Foreign Application Priority Data

Apr. 14, 1997 [JP] Japan .................................... 9-110105

[51] Int. Cl.[7] ............................... B32B 3/00; H01H 1/10; B28B 5/00

[52] U.S. Cl. .......................... 428/172; 428/195; 264/132; 264/241; 264/267; 264/328.1; 200/275; 200/341; 200/513; 156/244.16; 156/277

[58] Field of Search ..................................... 428/172, 174, 428/195, 207; 200/5 D, 5 EA, 5 A, 314, 315, 320, 275, 5 B, 277.1, 341; 156/277, 244.11, 244.16; 264/129, 132, 176.1, 241, 267, 297.2, 299, 328.1

[56] References Cited

U.S. PATENT DOCUMENTS

| | | | |
|---|---|---|---|
| 4,155,972 | 5/1979 | Hauser et al. | 264/250 |
| 4,449,774 | 5/1984 | Takashi et al. | 428/85 |
| 5,152,392 | 10/1992 | Isawa | 200/341 |

*Primary Examiner*—Donald Loney
*Attorney, Agent, or Firm*—McGlew and Tuttle, P.C.

[57] ABSTRACT

To make spherical shape of the terminal end of extruding part of a push-button switch to press a curved contact portion composed of a metal belleville spring and a resin film dome. In addition, the gate injecting mouth 4 for thermoplastic material 3 is opened in the side surface of the extruding part 2 or in the side projection made in a mold to inject the resin material in order to make molding of spherical shape of the terminal end of extruding part 2 of a push-button switch possible. By this structure, the present invention can provide a sheet-like key top having improved clicking touch and preventing break of a contact portion by residual stress.

9 Claims, 4 Drawing Sheets

SHEET-LIKE KEY TOP AND ITS MANUFACTURING METHOD

FIELD OF THE INVENTION

The present invention relates to various switch elements used in a telephone, a keyboard of a personal computer, and a controller, etc. and their manufacturing methods.

BACKGROUND OF THE INVENTION

The position of the gate mouth for injecting of thermoplastic material is commonly set to the terminal end of the extruding part forming a projecting bottom end of a key to make the flow of the material inside a mold on injection uniform. This also makes the mold structure simple in order to improve molding yield of a push-button switch integrated with a film, on which an display portion curved along the upper surface of the key top body made of thereon plastic material is printed. For this purpose the terminal end of the extruding part should be flat or a concave shape. A key switch has such contact portion such as a metal belleville spring with clicking touch and a resin film dome curved to the top direction on the bottom surface of a push-button switch integrated with a film, on which an display portion curved along the upper surface of the key top body made of thermoplastic material is printed thereon molded thermoplastic material. When the push-button switch is pushed, the terminal end of the extruding part projected in the bottom direction presses the metal belleville spring and the resin film dome to input a letter or symbol. By this reason, as shown in FIG. 7, the contact portion is frequently pushed without accurate contact between the center a of the extruding part 11 of the push-button and top b of the curved contact portion 12 with clicking touch. In this case, the clicking touch of the contact portion decreases and the contact portion cracks by residual stress.

SUMMARY OF THE INVENTION

The present invention provides sheet-like key top having an improved clicking touch and protection against breaking of a contact portion by residual stress through making the convexed terminal end of extruding part of a push-button switch to push the curved contact portion of a metal belleville spring, a resin film dome, etc. The molding of spherical shape for the terminal end of a push-button switch becomes possible by injecting thermoplastic material into the gate mouth for thermoplastic material, which is opened on the side of or the side projecting portion of the extruding part.

DETAILED DESCRIPTION OF THE PREFERRED EMBODIMENT

Figure 1:
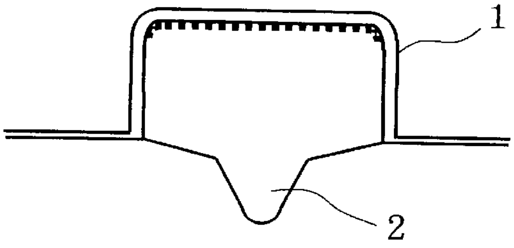
FIG. 1 shows a sectional view of a key top.
Figure 2:
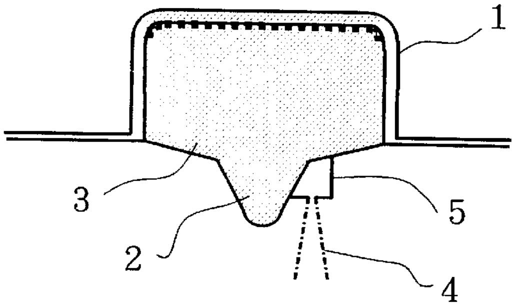
FIG. 2 shows a method of molding.

In the present invention, as shown FIG. 1, the terminal end of the extruding part 2 of a push-button switch 1 is made as a spherical shape. As shown in FIG. 2, the molding of spherical shape for the terminal end of a extruding part 2 becomes possible by injecting into the mouth 4 for thermoplastic material 3, which is opened on the side portion 5 formed on a mold or the side projecting portion of the extruding part 2.

Figure 3:
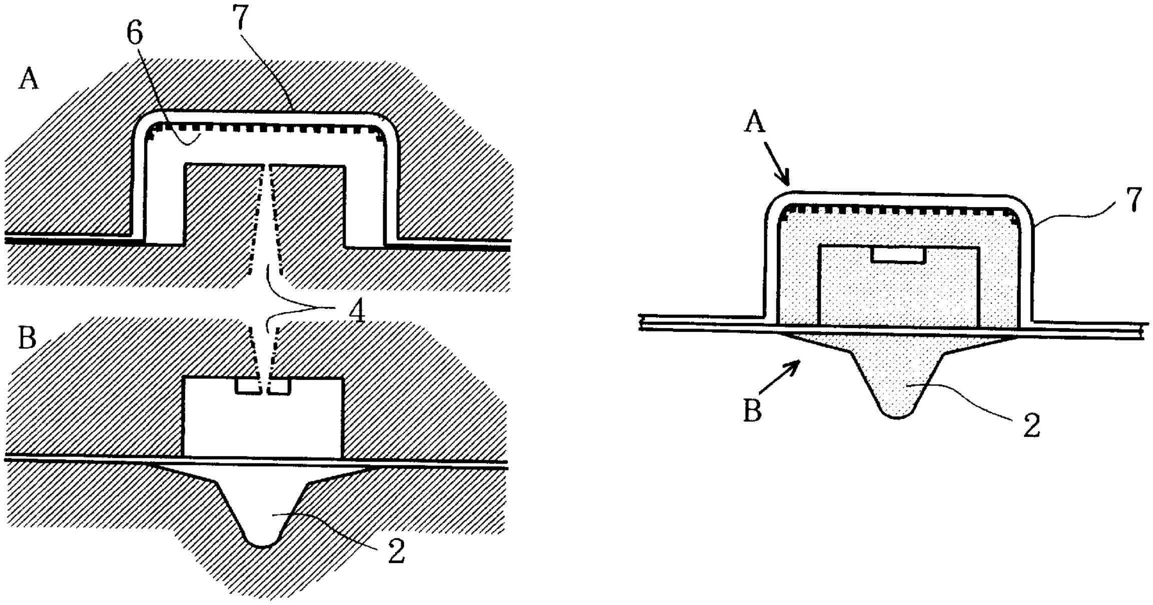
FIG. 3 shows a method of separate molding of the display portion of a key top and the piece of an extruding part.

In addition, as shown in FIG. 3, molding becomes possible by assembling to fix the display portion <u>A</u> of the key top to the extruding part <u>B</u> with the terminal end of spherical shape after separate forming of the key top display portion A of a film 7 on which display 6 was previously printed and the extruding part B with the terminal end of spherical shape. This fixing method can be carried out by using an adhesive tape with both sides working, an adhering method with an adhesive, a gluing method with a gluing agent, heating, or melting by ultrasonic wave.

The display portion <u>A</u> of a key top can be formed by injection molding of thermoplastic material holding a film 7, which display portion 6 has been previously printed, with the upper and lower dies of a mold for forming the display portion of the key top. The extruding part <u>B</u> with a terminal end of spherical shape can be formed by injection molding of thermoplastic material holding a film 9, on which a perforation has been previously made on a given position, with the upper and lower dies of a mold for forming the extruding part B with a terminal end of spherical shape.

The spherical shape of the terminal end of the extruding part makes the life of contact part composed of the metal belleville spring, the resin film dome, etc. longer and also makes troublesome positioning steps at assembling a sheet-like key top and these components of the contact portion simple. In addition, the variation of the shape of the terminal end of a extruding part can be diversified. The present invention is described in detail by the following examples shown in figures.

EXAMPLE 1.

Figure 4:
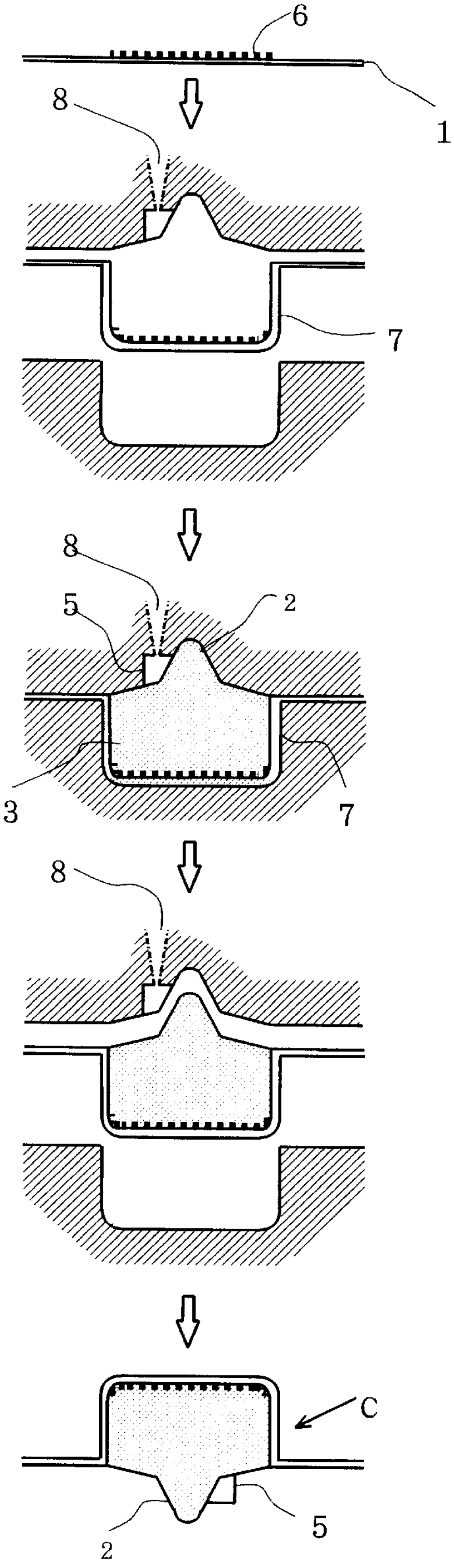
FIG. 4 shows a method of molding described in Example 1.

As shown in FIG. 4, a film 1, on which an display portion 6 has been previously printed, is set in a mold with the same shape as that of the desired shape of a key top. After mold clamping, thermoplastic material 3 is formed integrally with the film by injection molding. At this time, the injection gate mouth 8 is disposed on the side part of or the side projected portion 5 of the extruding part 2 having a terminal end of spherical shape to mold. The gate cutting is performed, at the same time, on opening. A product <u>C</u> is picked up and the push-button switch according to the present invention is molded.

EXAMPLE 2

Figure 5:
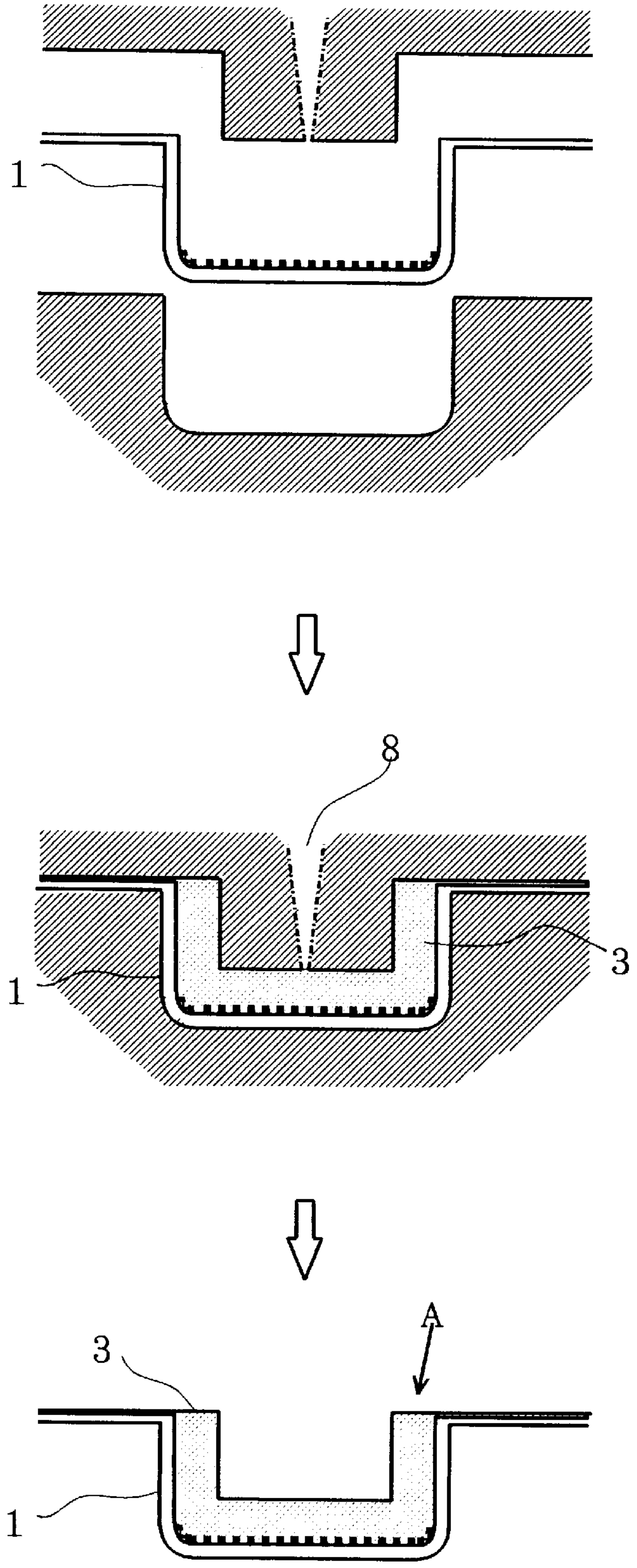
FIG. 5 shows a method of molding display portion of the key top described in Example 2.
Figure 6:
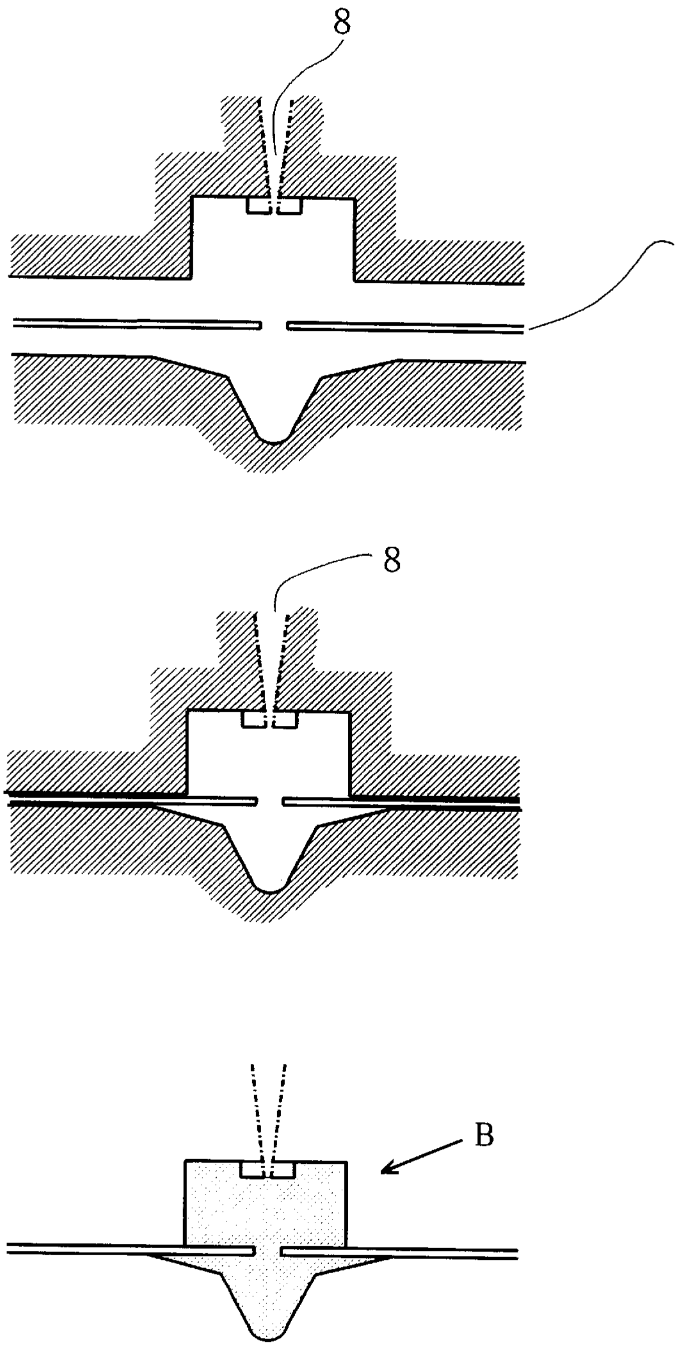
FIG. 6 shows a method of molding the piece of the extruding part described in Example 2.
Figure 7:
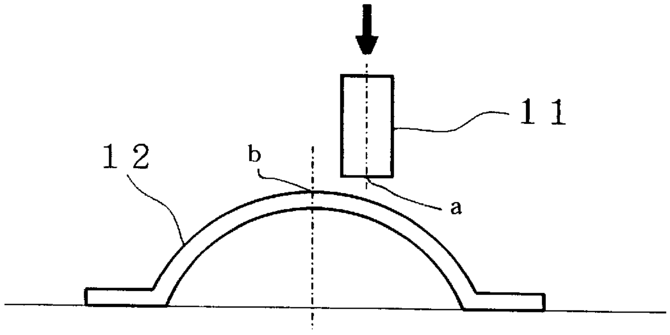
FIG. 7 shows a reference showing the pressed state of a conventional extruding part.

FIGS. 5 and 6 show other molding methods.

A film 1, on which a display portion 6 has been previously printed, is set in a mold. After mold clamping, thermoplastic material 3 is molded by injection through the gate mouth 8 to form the desired display portion <u>A</u> of a key top. Next, as shown in FIG. 6, a film 9 a previously made perforation at a given position is extended in the center of a mold to be set. A thermoplastic material 3 through a gate mouth 8 is injected to form the desired extruding part <u>B</u> with a terminal end of spherical shape at the upper and lower components holding the film. Next, an display portion <u>A</u> of a key top and a extruding part <u>B</u> with a terminal end of spherical shape which are separately formed are adjusted, and the several fixed points are adhered by melting with heat or ultrasonic wave to make the push-button switch of the present invention (FIG. 3).

Either an identical material or different materials can be used for the two-piece structure composed of the display portion A of a key top and a extruding part B with a terminal end of spherical shape, because fixing method of the film of the display portion of a key top not restricted. In addition, either an identical material or different materials can be used because adhesion is not necessary between the thermoplastic material of the display portion of a key top and thermoplastic material of a extruding part with a terminal end of spherical shape. Therefore, a clicking touch can be adjusted by free choice of a material to change a modulus of elasticity.

What is claimed is:

1. A key top sheet comprising:

a film having a print defining a display portion;

an upper sheet display portion formed of said film and a key top body with a key top having a shaped upper surface, said key top body being made of molded thermoplastic resin, said film being curved along said shaped upper surface;

a sheet extruded portion forming a bottom surface of the key top sheet, said extruded portion being formed as a single body and including a terminal end of a spherical shape.

2. The key top sheet according to claim 1, wherein said sheet extruded portion is formed as a separate part from said upper sheet display portion and is joined to said upper sheet display portion to form the key top sheet;

said upper sheet display portion is formed by printing said display portion on said film, holding said film between upper and lower pieces of a mold and injecting thermoplastic material into said mold;

said sheet extruded portion with the terminal end of spherical shape is formed by holding another film, said another film having been previously perforated at a given position, between upper and lower pieces of a mold and injecting a thermoplastic material for forming the extruded portion with the terminal end of spherical shape; and said upper sheet display portion and said extruded sheet portion with the terminal end of spherical shape are fixed to each other.

3. The key top sheet according to claim 2, wherein the key top sheet is formed by using a mold having an injecting mouth for thermoplastic material on a side portion or a projected side portion of said extruded sheet portion having the terminal end of a spherical shape, said sheet extruded portion being formed together with said upper sheet display portion as a unitary part based on the injection of thermoplastic material.

4. A key top sheet with individual keys and joining sheet portion, the key top sheet comprising:

an upper sheet display portion with a key top upper body with a key top having a shaped upper surface, the key top body being made of molded thermoplastic resin;

a film having a print defining a display portion, said film being curved along said shaped upper surface;

a sheet extruded portion forming a bottom surface of the key top sheet, said extruded portion being formed as a single body and including a terminal end of a spherical shape at said bottom surface.

5. The key top sheet according to claim 4, wherein said sheet extruded portion is formed as a separate part from said upper sheet display portion and is joined to said upper sheet display portion;

said upper sheet display portion is formed by printing said display portion on said film, holding said film between upper and lower pieces of a mold and injecting thermoplastic material into said mold;

said sheet extruded portion with the terminal end of spherical shape is formed by holding another film, which another film has been previously perforated at a given position, between upper and lower pieces of a mold and injecting a thermoplastic material for forming the extruded portion with the terminal end of spherical shape; and said upper sheet display portion and said extruded sheet portion with the terminal end of spherical shape are fixed to each other.

6. The key top sheet according to claim 4, wherein the key top sheet is formed by using a mold having an injecting mouth for thermoplastic material on a side portion or a projected side portion of said extruded sheet portion having the terminal end of a spherical shape.

7. A method of manufacturing a key top sheet with individual keys and joining sheet portion, the method comprising the steps of:

providing a film;

printing on the film to define a display portion for each of the keys;

curving the film along a shaped upper surface of a mold;

forming an upper sheet display portion with a key top upper body with a key top having a shaped upper surface, the key top body being made of molded thermoplastic resin, said film being curved along said shaped upper surface;

forming a sheet extruded portion forming a bottom surface of the key top sheet, said extruded portion including a terminal end of a spherical shape.

8. The method according to claim 7, wherein said sheet extruded portion is formed as a separate part single body from said upper sheet display portion and is joined to said upper sheet display portion;

said upper sheet display portion is formed by printing said display portion on said film, holding said film between upper and lower pieces of a mold and injecting thermoplastic material into said mold;

said sheet extruded portion with the terminal end of spherical shape is formed by holding another film, said film having been previously perforated at a given position, between upper and lower pieces of a mold and injecting a thermoplastic material for forming the extruded portion with the terminal end of spherical shape; and said upper sheet display portion and said extruded sheet portion with the terminal end of spherical shape are fixed to each other.

9. The method according to claim 7, wherein the key top sheet is formed by using a mold having an injecting mouth for thermoplastic material on a side portion or a projected side portion of said extruded sheet portion having the terminal end of a spherical shape, said sheet extruded portion being formed together with said upper sheet display portion as a unitary part.

* * * * *